No. 683,241. Patented Sept. 24, 1901.
J. M. ANCK.
SPEED CHANGING MECHANISM.
(Application filed Mar. 30, 1901.)
(No Model.)
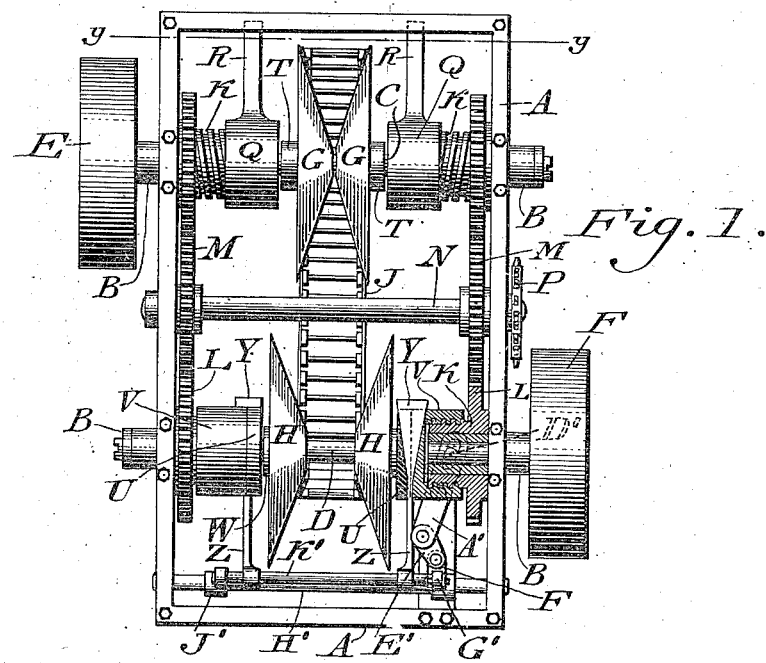
Fig. 1.
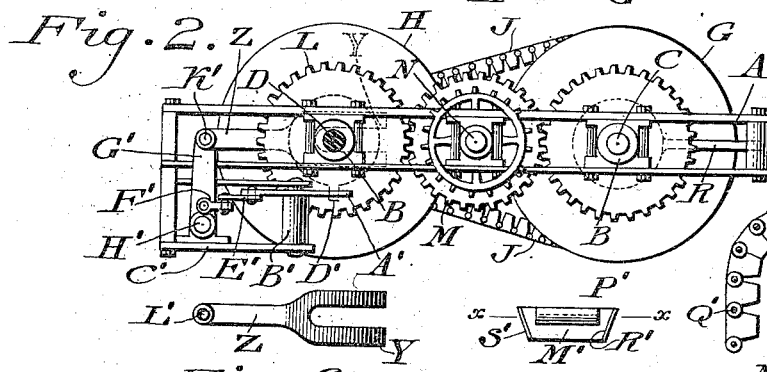
Fig. 2.   Fig. 3.
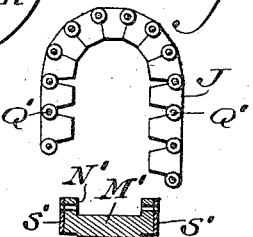
Fig. 6.   Fig. 4.   Fig. 5.
Fig. 7.
Fig. 8.
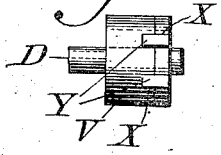
WITNESSES:
P. H. Nagle.
L. Couville.
INVENTOR
John M. Anck.
Diedersheim & Fairbanks
ATTORNEYS.

UNITED STATES PATENT OFFICE.

JOHN M. ANCK, OF PHILADELPHIA, PENNSYLVANIA.

SPEED-CHANGING MECHANISM.

SPECIFICATION forming part of Letters Patent No. 683,241, dated September 24, 1901.

Application filed March 30, 1901. Serial No. 53,590. (No model.)

*To all whom it may concern:*

Be it known that I, JOHN M. ANCK, a citizen of the United States, residing in the city and county of Philadelphia, State of Pennsylvania, have invented a new and useful Improvement in Speed - Changing Mechanism, of which the following is a specification.

This invention consists of an improvement in speed-changing mechanism, as will be hereinafter fully described and claimed.

Figure 1 represents a top plan view, partially in section, of a speed-changing mechanism embodying my invention. Fig. 2 represents a side elevation thereof, taken from the right-hand side of Fig. 1, with the pulley on that side of the device omitted. Fig. 3 represents a side elevation of a portion of the belt. Fig. 4 represents an end elevation of one link of said belt. Fig. 5 represents a section taken on the line $xx$ of Fig. 4. Fig. 6 represents a side elevation of a wedge employed and hereinafter referred to. Fig. 7 represents a sectional view taken on the line $yy$, Fig. 1. Fig. 8 represents a top plan of one of the movable sleeves through which the wedge shown in Fig. 6 passes.

Similar letters of reference indicate corresponding parts in the figures.

Referring to the drawings, the operative parts of my device are suitably mounted upon two frames A, suitably secured together and provided with bearings B for parallel shafts C and D. The shaft C is the driving-shaft and may receive its power from any suitable source—for instance, the pulley E. The shaft D is the driven shaft and is conveniently provided with a pulley F, belted to the point of use. Mounted upon and splined to each of said shafts are two cone-disks G G and H H. Trained around these cone-disks is a belt J, (shown in detail in Figs. 3, 4, and 5,) by means of which the power is communicated from one to the other. I provide mechanism for moving the disks toward and away from each other on the shafts that is so constructed that when one pair of cones are separating the others are approaching. To accomplish this, I mount upon each of the bearings B on the inside of the frame, as shown in section in Fig. 1, a screw-threaded sleeve K, that is provided with a gear-wheel L. These gear-wheels L mesh with the gear-wheels M on a shaft N, mounted in bearings in the frame and which is conveniently provided with a sprocket-wheel P, by means of which it may be turned. The screw-sleeves upon the opposite ends of each shaft are provided with right and left hand screws, while the corresponding sleeves on different shafts have also right and left hand screws. Mounted upon the screw-sleeves K of the shafts C are interiorly-screw-threaded collars Q, that can move longitudinally upon said shaft, but are held against rotation by means of arms R, that project therefrom and are held between guide-rods S. (Shown in Fig. 7.) The inner ends of these collars Q abut against hubs T on the outer ends of the disks G G. From the foregoing it will be seen that when the screw-sleeves K K upon the shaft C are turned the collars Q will be moved toward or away from each other to cause the disks to approach each other or to allow them to separate. The means for causing a like movement of the disks H on the shaft D are in the main the same, although I have combined therewith mechanism to vary the speed at which the disks move in separating and approaching—that is to say, I provide means for causing the different pairs of disks to move at varying speeds and which, although I have applied only to the disks H, may be applied to the disks G. To accomplish this, I have shown washers U applied to the inner ends of the collars V of the lower shaft and which abut against the hubs W of cones H. These washers move longitudinally on said shaft relative to the collars. Extending through guide-grooves X in the meeting faces of the washers U and collars V are wedges Y, (shown in Figs. 1, 2, 6, and 8,) the same being carried by arms Z, the upper end of said arms being forked and the members of the fork forming said wedges Y. Said wedges Y are situated on opposite sides of the shaft D, as shown in Figs. 2 and 8. By a longitudinal movement of said wedges the washers U are moved upon the shaft relative to the collars V, and such longitudinal movement of the wedges is caused by the longitudinal movement of the said collars V. The mechanism for accomplishing this is constructed as follows: A lever A' is pivoted upon the post B', mounted upon the bracket C', being provided with a slot at one end that receives the pin D', extending from the collar V, whereby the longitudinal movement of said collar turns said lever on its pivot. Pivotally connected with the other end of the lever is a link E', that is pivotally connected with another link F', connected with an arm G' by a pivot extending at right angles to the pivots between said links E' and F'. The said arm G' is rigidly connected with a rock-shaft H', from the other end of which extends an arm J', and a bar K' is fastened to the outer ends of these arms G' and J'. The lower ends of the arms or stems Z of the wedges are provided with openings L', through which the bar K' extends, said stems being capable of sliding longitudinally on said bar. The particular construction of belt shown consists of a plurality of links M', connected by pins, as above shown in Figs. 3, 4, and 5, one end of each link being bifurcated, as at N', to receive a projection, as P', on the opposite end of a link. These bifurcations and projections are perforated to receive the pins Q'. The sides of these links are inclined or beveled, as shown at R', such inclination corresponding to the inclination of the faces of the disks and being provided with facing pieces or layers S', of leather or analogous yielding or other suitable material, so as to provide the necessary friction between the belt and the disks, it being understood, of course, that the ends of the pins Q' do not project beyond the outer faces of these facing-pieces S'.

The operation is as follows: When the parts are in the position shown in Figs. 1 and 2, the shaft D is being driven at a higher rate of speed than that at which the shaft C rotates. When the relative speed of the shafts is to be changed, the shaft N is turned by any suitable means, and through the intermediacy of the gearing between the said shaft N and the screw-sleeves K the latter are rotated upon the bearings B, which causes the collars Q and V to be moved longitudinally, it being understood that the collars on each shaft are moved in opposite directions, while the corresponding collars of different shafts are also moved in opposite directions, so that in the instance illustrated in Fig. 1 the collars Q would separate, while the collars V would approach each other. In view of the fact, however, that the length of belt required for the disks when in the position shown in Fig. 1 is greater than that required when both pairs of disks are separated to the same extent, I provide means for varying the speed at which the pairs of disks move in separating and when moving toward each other, and although these means may be applied to both pairs of disks, in which case the extent of movement of the washer U would be only half of what it is in the instance illustrated, yet the same result would be accomplished. This variation in the speed at which the disks move is attained by the use of the wedges Y. For instance, it is understood that the pitch of the right and left hand threads of the sleeves K are the same and that the collars Q and V will be moved thereby at the same rate of speed; but in the instance illustrated in Fig. 1 when the right-hand collar V begins to move it will turn the lever A' on its pivot and by means of links E' and F' of the arm G' will rock the shaft H', so that said arms G' and J' are moved away from the shaft D, drawing the wedges X with them, and thus causing the washers U to be moved away from the collars V, so that in addition to the speed at which the disks H are moved by means of the screw-sleeve K and collars V there is an increase in speed effected by said wedges and washers, as will be obvious. This increased speed continues until the lever A' stands at a right angle to the axis of the shaft D. This position is reached when the disks G have completed half the movement of which they are capable—that is to say, when they have been separated half-way—but at the same time the disks H, due to their increased speed by reason of the wedges, have moved together more than half the distance of which they are capable in approaching each other. At this point, however, the wedges begin to be moved in the opposite direction and to allow the washers U to again approach the collars V, which, it will be obvious, has the opposite effect, so that during the last portion of the movement of the disks H either toward or away from each other their rate of speed is less than that at which the disks G move.

Having thus described my invention, what I claim as new, and desire to secure by Letters Patent, is—

1. In a speed-changing mechanism, driving and driven shafts, cone-disks rotatable therewith and longitudinally movable thereon, a suitably-mounted longitudinally-movable member situated beyond the outer end of each of said cone-disks, means situated at the outer end of each of said members for moving the same in opposite directions, the said means of each shaft being geared together and to the means on the other shaft to move the members on each shaft in opposite directions and to move corresponding members on both shafts in opposite directions, and a belt trained around said cone-disks.

2. In a speed-changing mechanism, driving and driven shafts, cone-disks rotatable therewith and longitudinally movable thereon, a suitably-mounted longitudinally-movable collar situated beyond the outer end of each of said cone-disks, a suitably-mounted rotatable sleeve situated at the outer end of each of said collars and having screw-threaded engagement therewith, said sleeves being geared together to move in unison, and a belt trained around said cone-disks.

3. In a speed-changing mechanism, driving and driven shafts, cone-disks rotatable therewith and longitudinally movable thereon, a suitably-mounted longitudinally-movable collar situated beyond the outer end of and engaging each of said cone-disks, means for holding said collars against rotation, a suitably-mounted sleeve situated at the outer end of each of said collars and having screw-threaded engagement therewith, the screw-threaded engagement between the sleeves and collars on each shaft being right and left hand and the screw-threaded engagement between corresponding sleeves and collars on different shafts being right and left hand, said sleeves being geared together to move in unison, and a belt trained around said cone-disks.

4. In a speed-changing mechanism, driving and driven shafts, cone-disks rotatable therewith and longitudinally movable thereon, interiorly-screw-threaded collars loosely mounted on said shaft, said collars being held against rotation, exteriorly-screw-threaded rotatable sleeves suitably mounted and engaging said collars, said sleeves being provided with gears, a shaft having gears rigid therewith and engaging the said gears of the sleeves, and a belt trained around said cone-disks.

5. In a speed-changing mechanism, driving and driven shafts, cone-disks rotatable therewith and longitudinally movable thereon, a suitably-mounted longitudinally-movable collar situated beyond the outer end of each of the cone-disks of one shaft, each of said collars being provided with arms engaging guides parallel with said shaft, a suitably-mounted longitudinally-movable collar situated beyond the outer end of each of the cone-disks of the other shaft and held against rotation, said collars engaging said cone-disks, means situated at the outer end of each of said collars for moving the collars on each shaft in opposite directions and the corresponding collars on different shafts in opposite directions, and a belt trained around said cone-disks.

6. In a speed-changing mechanism, a frame having bearings, driving and driven shafts mounted in said bearings, cone-disks rotatable with and longitudinally movable upon said shafts, a suitably-mounted longitudinally-movable collar situated beyond the outer end of and engaging each of said cone-disks, said collars being held against rotation, a sleeve rotatably mounted upon each of said bearings and at the outer end of said collars and having screw-threaded engagement with the latter, means for rotating said sleeves in unison, and a belt trained around said cone-disks.

7. In a speed-changing mechanism, driving and driven shafts, cone-disks rotatable therewith and longitudinally movable thereon, means situated beyond the outer end of each of said cone-disks for moving said cone-disks in opposite directions and for moving the cone-disks of different shafts at speeds that vary relatively to each other, each of said means comprising a longitudinally-movable non-rotatable member and a longitudinally-immovable rotatable member, the longitudinally-immovable rotatable members being geared together to move in unison, and a belt trained around said cone-disks.

8. In a speed-changing mechanism, driving and driven shafts, cone-disks rotatable therewith and longitudinally movable thereon, means situated beyond the outer end of each cone-disk for moving the same in opposite directions and for causing the cone-disks on one shaft to move faster during a portion of their movement and slower during the remaining portion of their movement than the cone-disks on the other shaft, each of said means comprising a longitudinally-movable non-rotatable member and a longitudinally-immovable rotatable member, said longitudinally-immovable rotatable members being geared together to move in unison, and a belt trained around said cone-disks.

9. In a speed-changing mechanism, driving and driven shafts, cone-disks rotatable therewith and longitudinally movable thereon, means common to the cone-disks on both shafts for moving the cone-disks on each shaft and corresponding cone-disks on different shafts in opposite directions, the connection between said means and cone-disks being such that when said means are operated at a constant rate of speed, the cone-disks on one shaft move at a constant rate of speed throughout their entire movement and the cone-disks on the other shaft move at a varying rate of speed, and a belt trained around said cone-disks.

10. In a speed-changing mechanism, driving and driven shafts, cone-disks rotatable therewith and longitudinally movable thereon, means common to the cone-disks on both shafts for moving the cone-disks on each shaft and corresponding cone-disks on different shafts in opposite directions, the connection between said means and cone-disks being such that when said means are operated at a constant rate of speed the cone-disks on one shaft move at a constant rate of speed throughout their entire movement and the cone-disks on the other shaft move at a rate of speed that varies from fast to slow as they approach each other and vice versa as they recede, and a belt trained around said cone-disks.

11. In a speed-changing mechanism, driving and driven shafts, cone-disks, longitudinally-movable collars engaging the cone-disks of one of the shafts, longitudinally-movable collars upon the other shaft, washers situated between said last-mentioned collars and the cone-disks, said washers being longitudinally movable upon the shaft relative to said collars, means for moving said collars longitudinally upon the shaft, means for moving said washers relative to said collars, and a belt trained around said cone-disks.

12. In a speed-changing mechanism, driving and driven shafts, cone-disks, longitudinally-movable collars engaging the cone-disks